United States Patent
Idicula et al.

(10) Patent No.: US 7,020,653 B2
(45) Date of Patent: Mar. 28, 2006

(54) TECHNIQUES FOR SUPPORTING APPLICATION-SPECIFIC ACCESS CONTROLS WITH A SEPARATE SERVER

(75) Inventors: Sam Idicula, Foster City, CA (US); Nipun Agarwal, Santa Clara, CA (US); Ravi Murthy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 531 days.

(21) Appl. No.: 10/364,610

(22) Filed: Feb. 10, 2003

(65) Prior Publication Data

US 2004/0088340 A1 May 6, 2004

Related U.S. Application Data

(60) Provisional application No. 60/424,543, filed on Nov. 6, 2002.

(51) Int. Cl.
G06R 17/30 (2006.01)

(52) U.S. Cl. .......................................... 707/10
(58) Field of Classification Search ............... 707/1–10, 707/100–104.1, 200–205; 709/237, 216, 709/217, 207; 710/62; 713/200, 201; 711/164; 715/511; 370/450
See application file for complete search history.

(56) References Cited

U.S. PATENT DOCUMENTS

| | | | | |
|---|---|---|---|---|
| 4,993,025 | A | * 2/1991 | Vesel et al. | 370/450 |
| 5,226,137 | A | * 7/1993 | Bolan et al. | 711/164 |
| 5,404,513 | A | 4/1995 | Powers et al. | |
| 5,463,772 | A | 10/1995 | Thompson et al. | |
| 5,506,991 | A | * 4/1996 | Curry et al. | 710/62 |

(Continued)

FOREIGN PATENT DOCUMENTS

| | | |
|---|---|---|
| EP | 1 241 589 A2 | 9/2002 |
| WO | WO 00/49533 | 8/2000 |
| WO | WO 01/59602 A1 | 8/2001 |
| WO | WO 01/61566 A1 | 8/2001 |
| WO | 2004/044738 A3 | 5/2004 |

OTHER PUBLICATIONS

Deborah A. Wallach et al., ASHs:Application–specific handlers of high–performance messaging, 1996, ACM Press, p.p. 40–52.*

Chandramohan A. Therkkath et al., Implementing network protocols at user level, 1993, ACM Press, pp. 64–73.*

Joon S. Park, Towards secure collaboration on the semantic web, Jun. 2003, ACM Press, vol. 33, Issue 2, pp. 1–10.*

Josephine Cheng, et al., "IBM DB2 XML Extender," IEEE, ICDE '00 Conference, San Diego, Feb. 2000, 128 pages.

(Continued)

Primary Examiner—Diane D. Mizrahi
(74) Attorney, Agent, or Firm—Hickman Palermo Truong & Becker LLP (57) ABSTRACT

Techniques for supporting access controls on application-specific operations performed by an application include receiving first data at a server distinct from the application. The first data describes a first set of privileges for performing a first set of application-specific operations. Second data is also received at the server. The second data associates a first user of the application with a privilege in the first set of privileges. In response to receiving a request at the server from the application, it is determined whether a particular user may have the application perform a particular application-specific operation based on the first data and the second data. The request indicates the particular user and the particular application-specific operation. A response is sent to the application. The response indicates whether the particular user may have the application perform the particular application-specific operation.

38 Claims, 4 Drawing Sheets

U.S. PATENT DOCUMENTS

| | | | |
|---|---|---|---|
| 5,680,614 A | | 10/1997 | Bakuya et al. |
| 5,940,591 A | * | 8/1999 | Boyle et al. ................. 713/201 |
| 5,974,407 A | | 10/1999 | Sacks |
| 6,023,765 A | * | 2/2000 | Kuhn ......................... 713/200 |
| 6,055,544 A | | 4/2000 | DeRose et al. |
| 6,128,610 A | | 10/2000 | Srinivasan et al. |
| 6,141,655 A | | 10/2000 | Johnson et al. |
| 6,192,476 B1 | | 2/2001 | Gong |
| 6,208,993 B1 | | 3/2001 | Shadmone |
| 6,236,988 B1 | | 5/2001 | Aldred |
| 6,279,007 B1 | | 8/2001 | Uppala |
| 6,370,537 B1 | | 4/2002 | Gilbert et al. |
| 6,449,652 B1 | | 9/2002 | Blumenau et al. |
| 6,470,344 B1 | | 10/2002 | Kothuri et al. |
| 6,487,546 B1 | | 11/2002 | Witkowski |
| 6,496,842 B1 | | 12/2002 | Lyness |
| 6,542,898 B1 | * | 4/2003 | Sullivan et al. ............. 707/102 |
| 6,704,739 B1 | | 3/2004 | Craft et al. |
| 6,704,747 B1 | | 3/2004 | Fong |
| 6,725,212 B1 | | 4/2004 | Couch et al. |
| 2002/0056025 A1 | | 5/2002 | Qui et al. |
| 2002/0133484 A1 | | 9/2002 | Chau et al. |
| 2003/0004937 A1 | | 1/2003 | Salmenkaita et al. |
| 2003/0009361 A1 | | 1/2003 | Hancock et al. |
| 2003/0065659 A1 | | 4/2003 | Agarwal et al. |
| 2003/0101194 A1 | | 5/2003 | Rys et al. |
| 2004/0043758 A1 | | 3/2004 | Sorvari et al. |
| 2004/0088415 A1 | | 5/2004 | Chandrasekar et al. |
| 2004/0176958 A1 | | 9/2004 | Salmenkaita et al. |
| 2004/0225680 A1 | | 11/2004 | Cameron et al. |
| 2004/0230893 A1 | * | 11/2004 | Elza et al. ................... 715/511 |

OTHER PUBLICATIONS

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, 20 (1991) Jun., No. 2, New York, US, XP 000364619, pp. 50-59.

R. Bourett, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al., "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. $17^{th}$ IASTED International Conference on Applied Informatics, Feb. 15-18, 1999, abstract.

Chakraborthy, Krishnendu, "The XML Garbage Collector", The Source for Developers, Sun Developer Network Site XP-002297849, Mar. 2002.

Written Opinion, Application No. PCT/US03/35551 (8 pages).

Current claims in PCT/US03/35551, pp. 20-23.

Wolfgang May, "Querying Linked XML Document Networks in the Web", The Eleventh International WWW Conference, May 7, 2000, XP002300873, Honolulu Hawaii, USA, http://www2002.org/CDROM/alternet/index-bytitle.html, 8 pgs.

International Search Report from PCT for International Application No. PCT/US03/35552 dated Nov. 8, 2004 (7 pgs.).

Written Opinion from PCT for International Application No. PCT/US03/35552 dated Nov. 10, 2004 (6 pgs.).

Current Claims in PCT Patent Application No. PCT/US03/35552.

International Search Report for corresponding PCT international patent application No. PCT/US03/35494.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

* cited by examiner

TECHNIQUES FOR SUPPORTING APPLICATION-SPECIFIC ACCESS CONTROLS WITH A SEPARATE SERVER

CROSS REFERENCE TO RELATED APPLICATION

The present application claims priority to U.S. Provisional Patent Application No. 60/424,543, filed Nov. 6, 2002, entitled "Techniques for Managing Hierarchical Information in a Database," by Sivasankaran Chandrasekar, Ravi Murthy, Nipun Agarwal, Eric Sedlar, Sam Idicula, Fei Ge, the entire contents of which are incorporated herein by reference for all purposes, and is related to U.S. patent application Ser. No. 10/259,176, filed Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, Nicolas Montoya (hereinafter "Murthy"), the entire contents of which are incorporated herein by reference for all purposes.

BACKGROUND OF THE INVENTION

The client-server model of computer process interaction is widely used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications.

The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context.

A database server provides database services in response to requests from a database client. For example, the database server writes data received in the request into one or more data containers in a particular database managed by the database server; or, the database server retrieves data from one or more of those containers that satisfy conditions specified in the request; or, it does both. In many circumstances the database client is a mid-tier application, distinct from the database server, which performs other services, such as accounting services, for one or more application users. The application itself may be configured for client-server operations, so that application users operate application clients that make application requests to an application server.

Not all users of a database server are granted access to all data in all the database objects managed by the database server. Consequently, it is common for a database server to implement access controls that control access of database users to the data in the database. Many access control mechanisms are known; for example, a uniform access control mechanism described in Murthy provides access controls for data content that appears to a database user to be organized in a hierarchy of storage containers, or in a relational database of tables with defined columns, or both.

The access controls are often implemented as privileges to perform database operations, with a set of one or more privileges associated with each user of the database for a particular data item or group of data items in the database. For example, basic privileges are defined for performing basic database operations, such as operations to read, insert, delete data of a data item, which may reside in a database object such as a table, or operations to create, modify or delete database objects themselves.

A privilege to perform a basic database operation may be associated with a particular level of the several levels of the database. The levels of a database include, for example, a level of a data item, a level of a database object of several data items, a level of a node of a hierarchy of several database objects, and a level of a parent node of several descendent nodes of database objects. When a privilege is associated with a particular level, the privilege may apply to all items at that level.

In some database management systems, a hierarchy of privileges may be defined, each node in the hierarchy representing the privilege to perform a certain combination of basic operations on one or more levels of the database. To support this hierarchy of privileges, the database servers in some database management systems provide infrastructure to describe privileges, to associate users and data items with privileges, and to efficiently store and retrieve information in a fast memory cache about the privileges to determine quickly whether the database user may perform a requested database operation on a requested data item or database object.

An infrastructure that supports access control to a database based on privileges to perform database operations provides the access control at the granularity of database operations. However, the ability to provide access control at the database-operation level of granularity is not particularly useful when one wants to control access based on operations defined in an application that uses the database. Such operations are referred to herein as "application-specific" operations.

For example, in an application to manage purchase orders for an enterprise, application-specific operations include: creating a new purchase order, approving the purchase order, issuing the purchase order to make a purchase, associating an invoice with a particular purchase order, confirming acceptance of an order delivered, and clearing the purchase order by paying the associated invoice. If certain application users are to be given privileges to perform some of these application-specific operations but not others, then access control must be provided at the application-specific-operation level of granularity. Since this level of granularity of access control is not provided by the database server, the developer of each application that uses application-specific-operation privileges must design and implement access control software that manages different privileges for different users.

There are several disadvantages to developing access control software for each application. One disadvantage is that the cost of developing the application is increased because development resources are consumed to generate the software to implement the access controls. The more sophisticated the access controls, the more costly the development costs. Conversely, the less spent on developing access controls, the less sophisticated are the access controls implemented. Another disadvantage is that access controls developed for the new application are often less efficient than access controls already developed for some systems and servers over many years. For example, some database servers have evolved with access controls that use minimal computational resources, including using efficient caching of data indicating user privileges.

Furthermore, administrators of multiple applications with independently developed access control mechanisms may have to contend with disparate interfaces for expressing the hierarchy of privileges and expressing the associations of application users and data items with those privileges. If the same access control infrastructure were available across multiple applications, the administrator for those multiple applications could more readily enter information about privileges and associated users and data items, with less concentration and fewer errors.

Based on the foregoing description, there is a clear need for making available to database applications the efficient access control mechanisms of database servers. In general, there is a need for making available to any application the sophisticated and efficient access, control mechanisms already implemented in a separate server.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for supporting access controls on application-specific operations with a separate server. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Certain embodiments are described in the following in the context of a database server and an application that is a database client. In this context, the application uses the database server not only to store data for the application, but also to support access controls for operations that are not database operations, but instead are operations specific to the application. Embodiments of the invention are not limited to this context, but may include any application relying on any separate server to support access controls on application-specific operations. Although the application and server are separate processes, in some embodiments both may execute on the same computer host.

According to one embodiment, access control for application-specific operations is achieved by the application sending to a server data that describes a first hierarchy of privileges for performing a first set of application-specific operations. The application also sends the server data that associates a first user of the application with a privilege in the first hierarchy of privileges. To determine whether a particular user is allowed to perform a particular application-specific operation, the application sends a request to the server. The request indicates the particular user and the particular application-specific operation. In response to receiving a request, the server determines, based on the data previously received from the application, whether a particular user may have the application perform a particular application-specific operation. A response is sent to the application. The response indicates whether the particular user may have the application perform the particular application-specific operation.

In some embodiments of these techniques, the data sent to the server by the application associates the first user of the application with a privilege in the first hierarchy for a specific type of data item that is stored in the server. In some embodiments, the application may provide to the server privilege information for several different users, or several different data items, or both.

Access controls can generally be expressed as a hierarchy of privileges to perform operations. Hierarchies are well-known mathematical constructs. In general, a hierarchy is composed of nodes at multiple levels. The nodes at each level are each linked to one or more nodes at a different level. Each node at a level below the top level is a child node of one or more of the parent nodes at a level above. In a tree hierarchy, each child node has only one parent node, but a parent node may have multiple child nodes. In a tree hierarchy, a node that has no parent node linked to it is the root node, and a node that has no child nodes linked to it is a leaf node. A tree hierarchy typically has a single root node. Tree hierarchies can be used to describe parent privileges that include one or more child privileges.

In a hierarchy of privileges, each leaf node corresponds to a privilege to perform one application-specific operation for which access is to be controlled. A privilege to perform more than one application-specific operation corresponds to an ancestor node in the hierarchy for the leaf nodes that correspond to the more than one application-specific operations.

Figure 1:
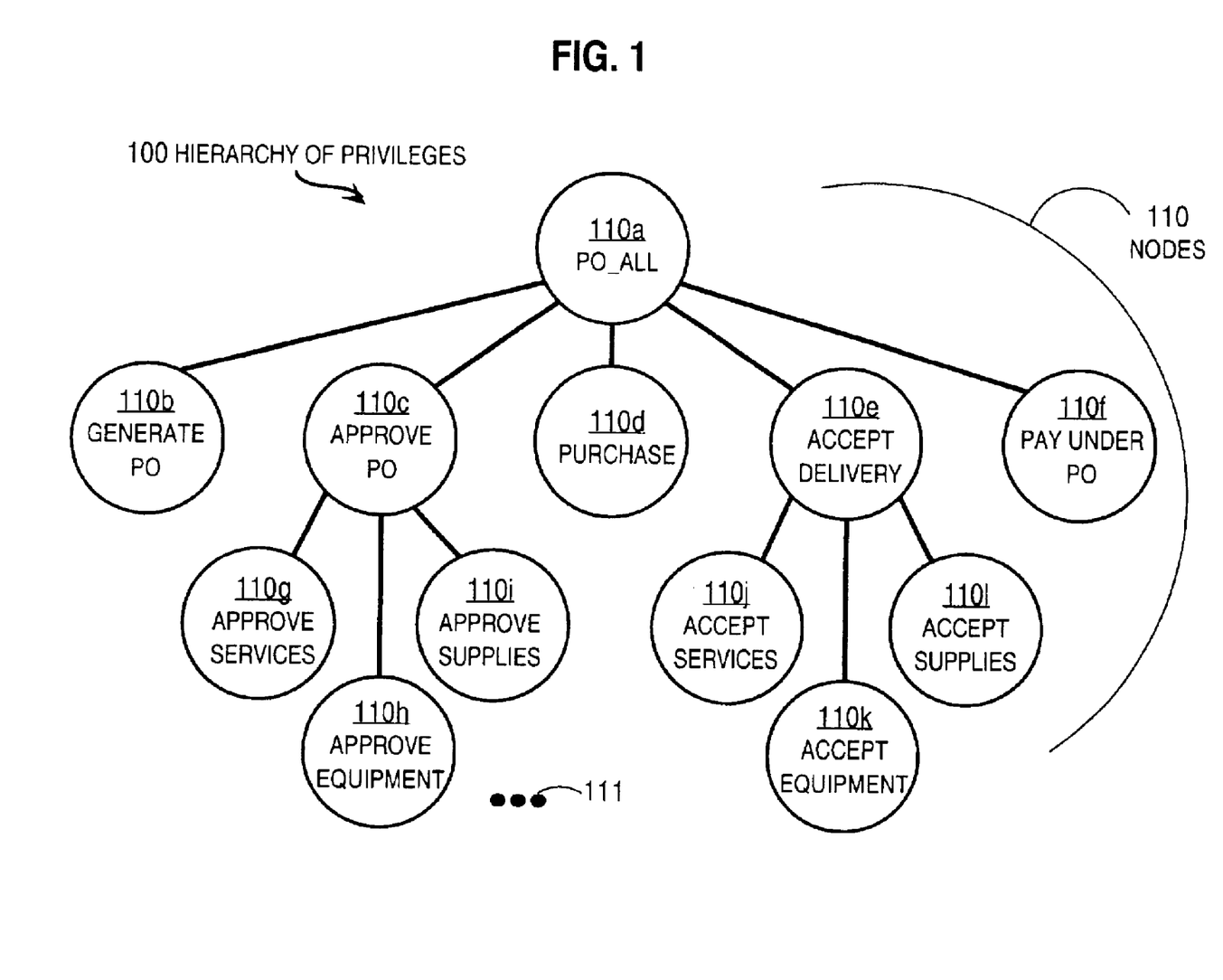
FIG. 1 is a block diagram that illustrates an example hierarchy of privileges to perform application-specific operations.

FIG. 1 is a block diagram that illustrates an example hierarchy 100 of privileges to perform application-specific operations for an application that manages purchase orders (POs) of an enterprise. In the example hierarchy 100, each node 110 corresponds to a privilege to perform one or more application-specific operations related to purchase orders (POs). Ellipsis 111 represents additional nodes representing additional privileges, if any. In other embodiments, a hierarchy of privileges may have more or fewer nodes at more or fewer levels.

Each leaf node in hierarchy 100 corresponds to each privilege to perform one of the application-specific operations for which access is to be controlled. In the illustrated embodiment, the privileges for single application-specific operations, and the corresponding leaf nodes, are listed in Table 1. Any of these privileges may be granted to any user of the application, at the discretion of an administrator for the application.

TABLE 1

Example hierarchy of privileges.

| Leaf Node | Privilege Name | Single application-specific operation allowed |
|---|---|---|
| 110b | Generate_PO | create a PO with a vendor name and address and a list of items from that vendor |
| 110g | Approve_Services | provide authorization to use a PO for purchase of services |
| 110h | Approve_Equipment | provide authorization to use a PO for purchase of capital equipment |
| 110i | Approve_Supplies | provide authorization to use a PO for purchase of supplies |
| 110d | Purchase | make a purchase from a vendor by sending an approved purchase order to the vendor |
| 110j | Accept_Services | indicate that services delivered under a PO are acceptable |
| 110k | Accept_Equipment | indicate that capital equipment delivered under a PO are acceptable |
| 110l | Accept_Supplies | indicate that supplies delivered under a PO are acceptable |
| 110f | Pay_under_PO | send payment for accepted deliveries under a PO to the vendor |

The hierarchy 100 also includes parent nodes that represent privileges for more than one application-specific operation. The privilege named Approve_PO at parent node 110c includes the privileges at nodes 110g, 110h, 110i to approve services, equipment, and supplies, respectively. The privilege named Accept_Delivery at parent node 110e includes the privileges at nodes 110j, 110k, 110l to accept delivered services, equipment, and supplies, respectively. Privileges at such parent nodes may be granted to certain supervisory users of the application, such as department heads. The privilege for PO_ALL at node 110a includes the privileges at nodes 110b, 110c, 110d, 110e, 110f to generate POs, approve POs, make purchases with approved POs, accept deliveries of purchases under POs, and make payments for delivered purchases under POs, respectively. The privilege for PO_ALL includes the privileges to perform all the application-specific operations regarding purchase orders.

Structural Overview

Figure 2:
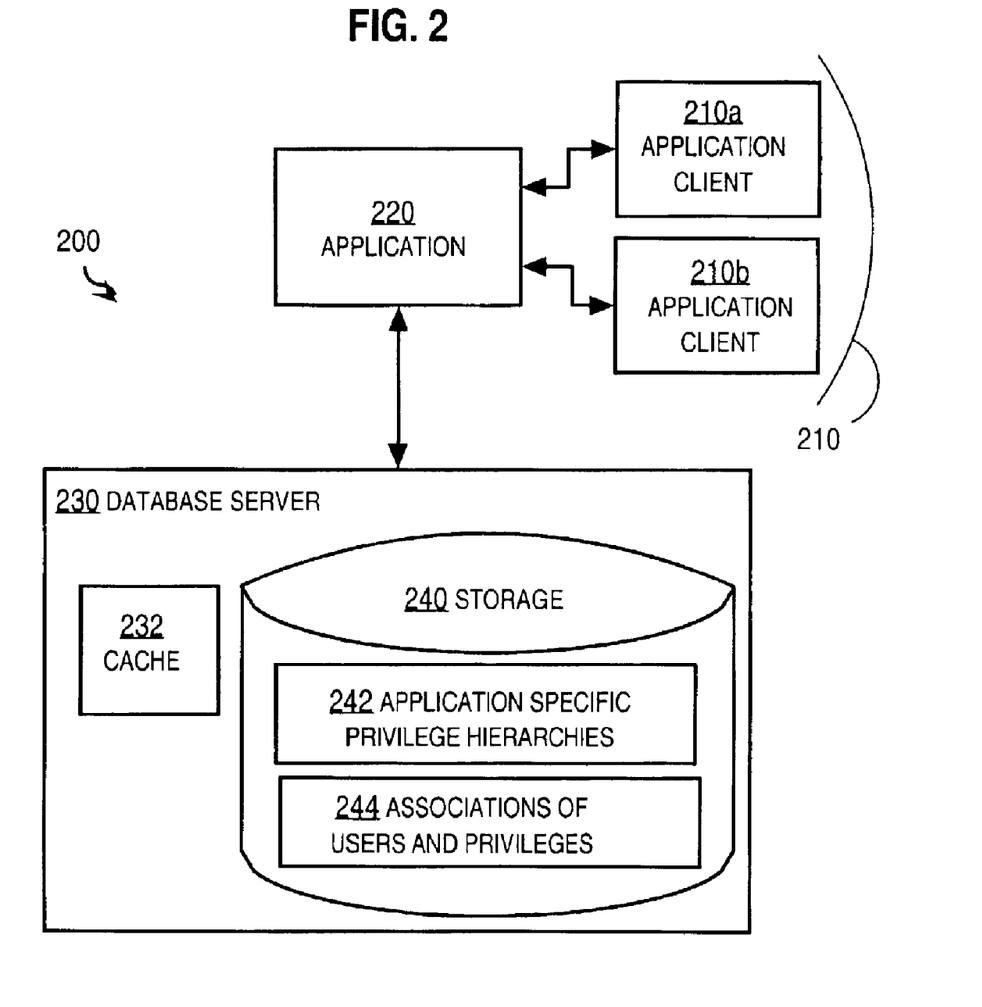
FIG. 2 is a block diagram that illustrates a system for supporting access controls on application-specific operations with a separate database server, according to an embodiment.

FIG. 2 is a block diagram that illustrates a system 200 for supporting access controls on application-specific operations with a separate database server, according to an embodiment. The system 200 includes application 220, application clients 210, and database server 230. Application 220 performs one or more application-specific operations in response to one or more commands from one or more application clients 210.

Database server 230 manages a database of one or more database objects for application 220. Database server 230 includes persistent storage 240 and a cache 232 in the fast but volatile memory of the database server 230. Note that database server 230 is a process. The persistent storage 240 and cache 232 are portions of the host persistent storage and host memory that are allocated to the database server process 230. As a consequence application 220 and database server 230 may execute on the same host using different portions of the host's persistent storage and different portions of the host's memory or the same portions of the host's memory at different times. Within the database server persistent storage 240, the database server 230 stores one or more data structures 242, 244 and one or more data items in one or more database objects (not shown). Data structure 242 holds data that represents one or more privilege hierarchies for application 220. Data structure 244 holds data that associates one or more users of application 220 and one or more data items with one or more privileges in the one or more privilege hierarchies represented in data structure 242 for application 220. Although shown as two data structures in FIG. 2, in other embodiments the data in data structures 242, 244 may be stored in more or fewer data structures.

Functional Overview

According to the illustrated embodiments, before application 220 performs, for a client, an application-specific operation for which access is controlled, application 220 sends a request to database server 230 to determine whether a user associated with the client has a privilege that allows the application 220 to perform the application-specific operation on a particular data item. Based on the request and information stored in data structures 242, 244, the database server 230 returns a response to the application 220. The response includes data that indicates whether the user has a privilege that allows the application 220 to perform the application-specific operation on the particular data item.

An administrator for the application 220 provides the information in data structures 242, 244. In the illustrated embodiments, the application administrator uses an eXtensible Markup Language (XML) document to store data that describe the hierarchies. XML is a well-known and widely-used markup language defined by standards promulgated by the World Wide Web Consortium (W3C) for describing structured data, and allows an arbitrary tree hierarchy of data elements. The application administrator then interacts with an interface provided by database server 230. The interface allows the application administrator to indicate the XML document that describes the hierarchies that apply to each data item or group of data items, and to indicate one or more privileges in each hierarchy, which apply to each user of the application 220.

In some embodiments, each of several privilege hierarchies for one application is associated with corresponding types of data items upon which the application-specific operations operate. For example, the privilege hierarchy 100 is associated with data items that represent purchase orders for an enterprise, but not with data items that represent personnel records for the same enterprise. Privileges to operate on personnel records are indicated in a second privilege hierarchy (not shown) different from privilege hierarchy 100. In such embodiments, the data in data structure 242 associates each privilege hierarchy with one or more types of data items upon which operate the operations allowed by those privileges.

Method for Supporting Access Controls on Application-Specific Operations

To illustrate this method, an example embodiment is described. In the example embodiment, an application administrator generates an eXtensible Markup Language (XML) document that describes the hierarchy of privileges for application-specific operations on purchase order objects. In other embodiments, other structured data formats may be used to represent a hierarchy of privileges.

In the example embodiment, each XML element corresponds to a node representing a privilege in the hierarchy of privileges. Table 2 illustrates portions of an example XML document that describes the example hierarchy 100 illustrated in FIG. 1.

TABLE 2

Portion of XML document describing example hierarchy of privileges.

| Line number | XML line |
|---|---|
| 1 | . . . |
| 2 | <PO_ALL> |
| 3 |    <Generate_PO/> |
| 4 |    <Approve_PO> |
| 5 |      <Approve_Services/> |
| 6 |      <Approve_Equipment/> |
| 7 |      <Approve_Supplies/> |
| 8 |    </Approve_PO> |
| 9 |    <Purchase/> |
| 10 |    <Accept_Delivery> |
| 11 |      <Accept_Services/> |
| 12 |      <Accept_Equipment/> |
| 13 |      <Accept_Supplies/> |
| 14 |    </Accept_Delivery> |
| 15 |    <Pay_under_PO/> |
| 16 | </PO_ALL> |
| 17 | . . . |

For purposes of illustration, it is assumed that the XML document with the lines listed in Table 2 is stored in a file named POprivileges.xml on a host computer for application 220. Each XML element has a name. The beginning of an XML element is represented by the symbols "<" ">" that bracket the name of the XML element. The end of an XML element is represented by the symbols "</" ">" that bracket the name of the XML element. All children elements of a parent element are included between the symbols representing the beginning and the end of the parent element. When an element has no children it can be represented, optionally, by the name of the element bracketed by the symbols "<" "/>."

The ellipses depicted in lines 1 and 17 of Table 2 represent XML lines in the XML document that precede or follow lines 2 through 16. The XML lines 2–16 indicate the XML element named "PO_ALL" that corresponds to the PO_ALL privilege. The PO_ALL element includes five child elements: Generate_PO in line 3; Approve_PO in lines 4–8; Purchase in line 9; Accept_Delivery in lines 10–14; and Pay_under_PO in line 15. The Approve_ element in lines 4–8 includes three child elements: Approve_Services in line 5; Approve_Equipment in line 6; and Approve_Supplies in line 7. The Accept_Delivery element in lines 10–14 includes three child elements: Accept_Services in line 11; Accept_Equipment in line 12; and Accept_Supplies in line 13. Thus the XML document with portions depicted in Table 2 describes the hierarchy 110 of privileges for purchase order operations depicted in FIG. 1.

Figure 3:
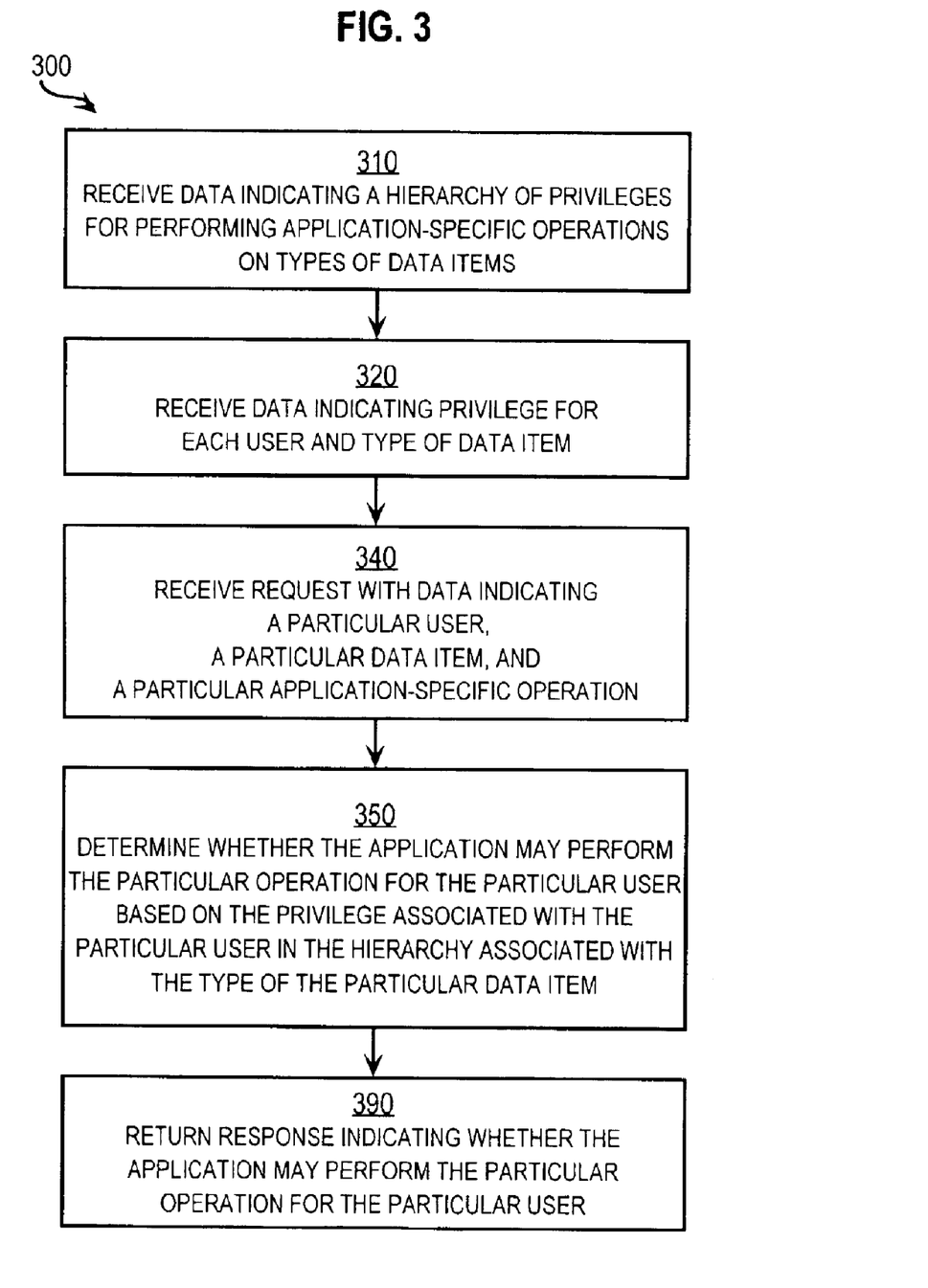
FIG. 3 is a flow diagram that illustrates an embodiment of a method for supporting access controls on application-specific operations with a separate server, according to an embodiment.

FIG. 3 is a flow diagram that illustrates an embodiment of a method 300 for supporting access controls on application-specific operations with a separate server, according to an embodiment. Although steps are indicated in a particular order in FIG. 3, in other embodiments, the steps may be performed in a different order or overlapping in time. For example steps 310 and 320 may overlap in time.

In step 310, the server receives data indicating a hierarchy of privileges for performing application-specific operations on types of data items. Any method for receiving the hierarchy of privileges may be used. For example, during step 310, an application administrator forms the XML document with the lines shown in Table 2, stores the document in the file POprivileges.xml, and employs the database server access control interface to indicate application-specific access controls should be supported by the database server using the hierarchy of privileges in file POprivileges.xml. In some embodiments, the database server access control interface is a graphical user interface, such as a HyperText Markup Language (HTML) page, well-known in the art, that prompts a user for input to specify application-specific access controls. In some embodiments, the database server access control interface is an application programming interface (API) well-known in the art, that comprises names and types of routines and parameters that are invoked to perform database server access control functions. In other embodiments, other interfaces to a server are employed.

In some embodiments, more than one privilege hierarchy is received for the same application. For example, if the application is an enterprise system, the application may include not only a hierarchy of privileges for a purchase order system, but also a hierarchy of privileges for other systems, such as a human resources system, a facilities management system, a product fabrication tracking system, and a wholesale sales system. The hierarchies that apply to the various systems often refer to application-specific operations on different types of data items stored by the application in the database. For example, the hierarchy of privileges depicted in FIG. 1 refer to operations listed in Table 1 that operate on purchase order database objects in the database, while a hierarchy of privileges for human resources refer to operations on personnel database objects in the database.

In some embodiments with more than one privilege hierarchy, during step 310, each privilege hierarchy is associated with a type of data item, and the type of data item is also received with the data that indicates the hierarchy of privileges. For example, the hierarchy indicated by the XML lines in Table 2 is associated with purchase order database objects in a database managed for the application by the database server 230. In some embodiments the association is made within the XML document; in some embodiments, the association is made at the interface to the database server access control system. In some embodiments, different hierarchies for the same application are distinguished by other means, such as a hierarchy name.

In step 320, the server receives data indicating privileges for each user and data item or group of data items. Any method for receiving such data may be used. For example, during step 320, an application administrator forms a second XML document associating a user identification ("user ID") with one or more privileges in the hierarchy 100 of privileges, and employs the database server access control interface to indicate the second XML document associates users with privileges. The interface may be a graphical user interface, such as a HTML page, an API, or some other interface for supplying data to the server. In some embodiments, the XML document specifies an access control list (ACL) for the Uniform Access Control System of Murthy, using XML lines such as those shown below in Table 3. In Table 3, a user who causes a client to command an application to do something that causes a controlled application-specific operation to be requested is called a "principal;" one principal has the user ID "SCOTT" and another principal has the user ID "PETER." In Table 3, each ACL includes one or more access control elements (ACE). Each ACE includes one principal element, naming a principal, and one privileges element. The privileges element includes a list of one or more privileges that are identified by their names in the hierarchy of privileges. The ellipses in lines 1 and 19 indicate other XML lines before and after the ACL. The ellipsis in line 17 indicates other XML lines specifying other ACEs.

TABLE 3

Portion of XML document describing privileges for each user.

| Line number | XML line |
|---|---|
| 1 | ... |
| 2 | <ACL> |
| 3 |    <ACE> |
| 4 |       <principal>SCOTT </principal> |
| 5 |       <privileges> |
| 6 |          <Generate_PO/> |
| 7 |          <Accept_Supplies/> |
| 8 |       </privileges> |
| 9 |    </ACE> |
| 10 |    <ACE> |
| 11 |       <principal>PETER </principal> |
| 12 |       <privileges> |
| 13 |          <Approve_PO/> |
| 14 |          <Pay_under_PO/> |
| 15 |       </privileges> |
| 16 |    </ACE> |
| 17 | ... |
| 18 | </ACL> |
| 19 | ... |

As shown in the example ACL of Table 3, user SCOTT may generate POs and accept delivery of supplies, while user PETER may approve any kind of PO and authorize payments to vendors.

In embodiments with multiple hierarchies, the privileges of a user in each of the hierarchies are specified during step 320. For example, if ACLs are used, there would be one set of ACLs specifying privileges in the purchase order hierarchy that applies to purchase order data items and another set of ACLs specifying privileges in a human resources hierarchy that supplies human resource data items.

In step 340, the server receives an access control request from the application. The request includes data that indicates a particular user and a particular application-specific operation and the data item on which the operation is to be performed. In embodiments with only one hierarchy that applies to all data items, the data item may be omitted. In embodiments with multiple hierarchies for one application, the privilege hierarchy to be used is inferred from the data item based on the type of the data item. A type of a data item indicates one or more data items or database objects. In some embodiments, the data indicating the particular application-specific operation is data that indicates a particular privilege for one or more of the application-specific operations.

For purposes of illustration, it is assumed that user SCOTT operates application 220 through client 210a, and that user PETER operates application 220 through client 210b. It is further assumed that user SCOTT has attempted to approve a particular purchase order, designated hereinafter as "PO12345," which user SCOTT has just generated for office supplies. This causes the application 220 to generate an access control request including data that indicates the user SCOTT is attempting to perform, on a purchase order data item PO12345, an application-specific operation that requires the Approve_Services privilege. The database server receives the request during step 340.

In step 350, the server determines whether the application may perform the particular operation for the particular user based on the privileges associated with the particular user for the particular data item. For example, database server 230 determines whether the application 220 may perform the operation that requires the Approve_Services privilege for SCOTT based on the privileges associated with SCOTT for purchase order data items in the hierarchy associated with purchase order data items.

During step 350, the server determines the appropriate hierarchy. For example, database server 230 determines that PO12345 is a purchase order type database object based on database metadata maintained by the database server 230. Database server 230 then determines that the hierarchy of privileges received during step 310, in the XML document partially listed in Table 2, is the appropriated hierarchy.

During step 350, the server determines whether the user has the privilege indicated in the request. For example, the database server 230 determines that the user SCOTT appears in the ACL listed in Table 3 in the ACE at lines 3–9 for purchase order data items, but that the privilege Approve_Services is not listed among the privileges listed in lines 5–8. Therefore, the user SCOTT does not have the privilege to perform this application-specific operation.

In step 390, the server returns a response to the application. The response includes data that indicates whether the application may perform the particular operation for the particular user. For example, database server 230 returns to application 220 a response indicating that the application 220 should not perform the approve services operations for user SCOTT associated with client 210a. Based on this response, the application does not perform the operation. In some embodiments, the application sends a message to the user's client that the user is not allowed to perform the application-specific operation, based on this response. For example, based on the response, the application 220 sends a message to client 210a that the user SCOTT is not allowed to approve a purchase order for services.

Representing User Privileges with Bitmaps

During step 350, as described above, the server determines whether the user has the privilege indicated in the request. It is advantageous to maintain privileges of users operating active clients of the application in a cache of fast memory. The more user privileges stored in cache, the more rapidly the server can respond to requests to support access control of application-specific operations. The more compactly the user privileges can be represented, the more users may be stored in the cache. According to an embodiment, the server represents the privileges associated with each user in cache using bitmaps. For example, database server 230 stores user privileges in cache 232 using bitmaps.

In this embodiment, the server associates each leaf node in a hierarchy with a bit position. For example, the nine leaf nodes listed in Table 1 for hierarchy 100 are associated with bit positions 1 through 9. When the server receives data indicating the privileges granted to a particular user (including reading such data from persistent storage), the server sets bits that correspond to the granted privileges to an "ON" value, e.g. "1," and sets bits that correspond to privileges not granted to an "OFF" value, e.g., "0." When a privilege corresponding to a parent node is granted, the bits corresponding to all leaf nodes that are descendents of that parent node are set to the ON value. For example, the privileges granted to users SCOTT and PETER in the XML lines listed in Table 3 are represented by the bitmaps listed in Table 4, where bit positions count from right (least significant bit) to left (most significant).

TABLE 4

Example bitmaps representing granted privileges in hierarchy of FIG. 1.

| User ID | Bitmap |
|---|---|
| SCOTT | 010000001 |
| PETER | 100001110 |

SCOTT is granted the privilege to generate a PO, the first leaf node 110b, so the ON value "1" is set in the first (rightmost) bit. SCOTT is also granted the privilege to accept delivered supplies, the eighth leaf node 110l, so the ON value "1" is set in the $8^{th}$ bit from the right. PETER is granted the privilege to approve POs, which is a parent node for the leaf nodes 110g, 110h, 110i to approve services, equipment, and supplies, respectively. Therefore, the bits corresponding to the three leaf node 110g, 110h, 110i are set to the ON value "1." These bits are in the second through fourth positions of the bitmap from the right. PETER is also granted the privilege to pay for deliveries, the ninth leaf node 100f, so the ON value "1" is set in the $9^{th}$ bit from the right, i.e., the leftmost bit.

In some embodiments with multiple hierarchies, the leaf nodes of all the hierarchies are assembled into a single bitmap. In other embodiments, leaf nodes of different hierarchies are assembled in different bitmaps. In some embodiments, bit positions may be determined using a hash function based on the hierarchy name and the privilege name.

In an example embodiment using bitmaps, during step 350, the database server 230 determines if the bitmap of a particular user for a particular data item is already in cache 232. If so, an operation to retrieve the bitmap from data stored on permanent storage 240 can be avoided. If not, a bitmap for the user is retrieved from permanent storage 240 and added to cache 232. If there is not sufficient space in cache 232 to place the retrieved bitmap, then space in cache is freed using any method known in the art. For example, the memory allocated to the least recently used bitmap is made available for the bitmap of the particular user.

The database server 230 then determines the bit position associated with the privilege for the application-specific operation, or privilege, indicated in the access control request received in step 340. For example, using the hierarchy represented in Table 2, the database server determines that the approve services operation associated with the Approve_Services privilege is associated with the second leaf node and therefore the second bit of the bitmap.

During step 350, the database server 230 then determines whether the bit in that bit position is set to the ON value. For example, the database server determines that the second bit is not set to the ON value in the bitmap for SCOTT listed in Table 4. Therefore, the database server determines that SCOTT does not have the privilege to approve services.

If the database server 230 receives a request from PETER to approve PO12345, during step 350 the database server 230 determines that the second bit is set to the ON value in the bitmap for PETER listed in Table 4. Therefore, the database server determines that PETER does have the privilege to approve services The use of cache 232 and bitmaps for determining the privileges of a user, as described here, is very efficient. An application developer may make use of such efficient determinations of privileges by a separate server, such as a database or content management server, without extensive software development. An application administrator simply provides the hierarchy of privileges and user privileges to the separate server one time, often using an interface already built for the separate server. A new application is developed, or an existing application is modified, simply to send access control requests to the separate server. The application does not need to be developed to efficiently determine whether privileges are available for an application-specific operation. For example, the application does not need to be developed to manage cache 232 or to form bitmaps of user privileges.

Hardware Overview

Figure 4:
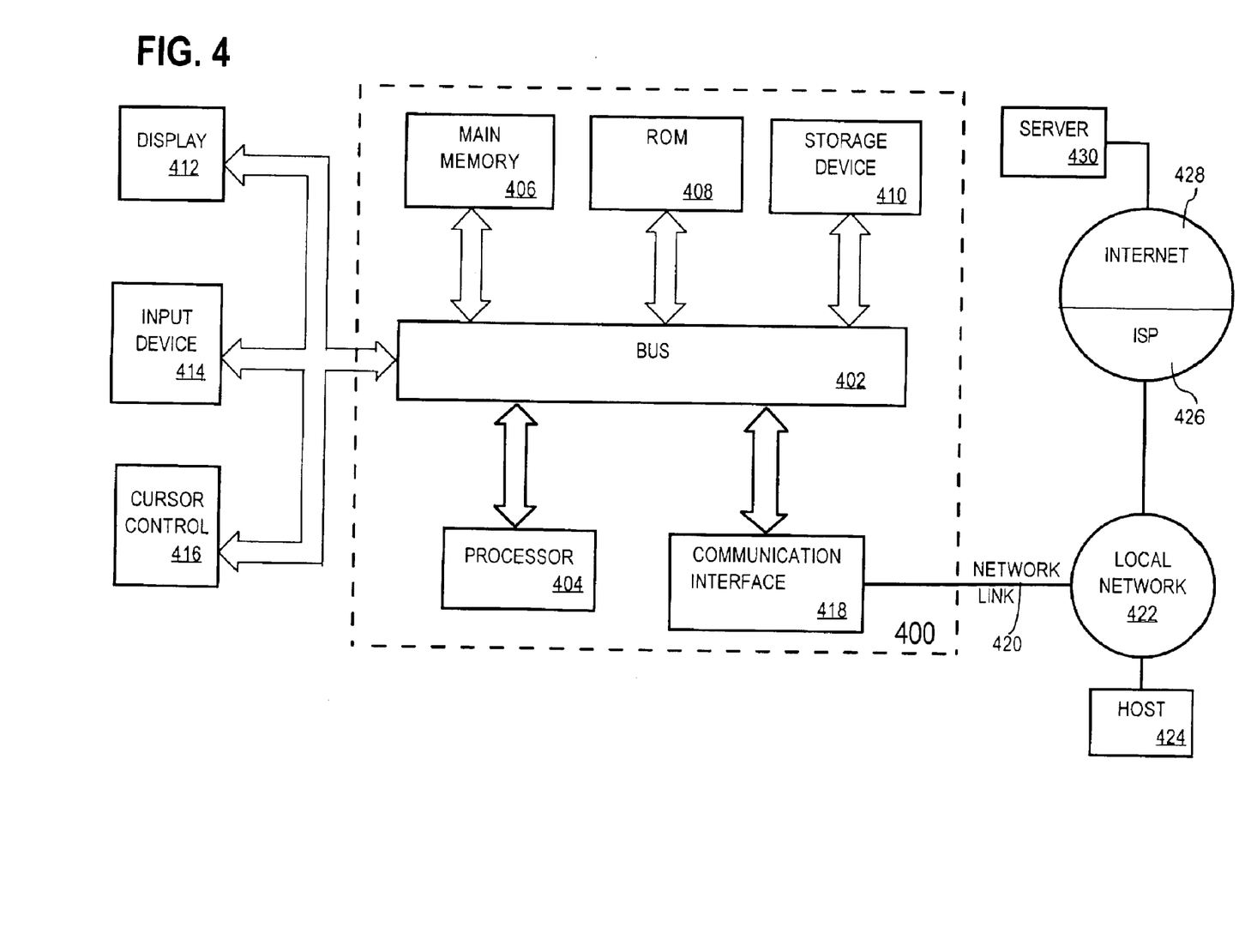
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for controlling access to application-specific operations performed by an application, comprising the steps of:
    receiving privilege information at a server that is distinct from the application;
    causing the server to determine, based on the privilege information, whether a particular application-specific operation is allowed under a particular set of conditions; and
    causing the server to communicate to the application an indication of whether the particular application-specific operation is allowed under said particular set of conditions.

2. The method of claim 1 wherein the step of receiving privilege information includes receiving, at said server, first data that describes a first set of privileges for performing a first plurality of application-specific operations.

3. The method of claim 2 wherein the step of receiving privilege information further includes receiving, at said server, second data that associates users of the application with one or more privileges in the first set of privileges.

4. A computer-readable medium carrying one or more sequences of instructions which, when executed by one or more processors, causes the one or more processors to perform the method recited in claim 3.

5. The method of claim 2, said step of managing the cache further comprising the step of storing in the cache data indicating a type of data item associated with each user.

6. A computer-readable medium carrying one or more sequences of instructions which, when executed by one or more processors, causes the one or more processors to perform the method recited in claim 5.

7. The method of claim 2, wherein the first set of privileges forms a first hierarchy of two or more levels of privileges.

8. A computer-readable medium carrying one or more sequences of instructions which, when executed by one or more processors, causes the one or more processors to perform the method recited in claim 7.

9. The method of claim 1 further comprising the steps of:
    in response to receiving, at the server from the application, a request that indicates a particular user and a particular application-specific operation, determining whether the particular user may have the application perform the particular application-specific operation based on the privilege information; and
    wherein the step of causing the server to communicate to the application an indication includes the step of sending to the application a response that indicates whether the particular user may have the application perform the particular application-specific operation.

10. The method of claim 9, wherein:
    said step of receiving privilege information further comprises receiving first data that associates a first set of privileges with a first type of data items upon which the plurality of application-specific operations operate; and said step of receiving the request further comprises receiving a request that also indicates a particular data item; and said step of determining whether the particular user may have the application perform the particular application-specific operation further comprises determining whether the particular data item is a member of the first type of data items.

11. The method of claim 10, wherein:

the method further comprises receiving, at the server, second data that describes a second set of privileges for performing a second plurality of application-specific operations on a second type of data items that is different than said first type of data items; and said step of determining whether the particular user may have the application perform the particular application-specific operation is based, in part, on the particular type of the particular data item.

12. A computer-readable medium carrying one or more sequences of instructions which, when executed by one or more processors, causes the one or more processors to perform the method recited in claim 11.

13. A computer-readable medium carrying one or more sequences of instructions which, when executed by one or more processors, causes the one or more processors to perform the method recited in claim 10.

14. The method of claim 9, said step of determining whether the particular user may have the application perform the particular application-specific operation further comprising the step of managing a cache in fast memory for storing information that associates each of one or more users with one or more privileges in each of one or more sets of privileges.

15. The method of claim 14, said step of managing the cache further comprising the step of storing in the cache a bitmap for each user, wherein:

each set of privileges forms a hierarchy of one or more levels of privileges;

each different position in the bitmap corresponds to one different leaf node in each hierarchy of the one or more sets of privileges; and a leaf node is a node of a hierarchy that does not have any child node.

16. A computer-readable medium carrying one or more sequences of instructions which, when executed by one or more processors, causes the one or more processors to perform the method recited in claim 15.

17. A computer-readable medium carrying one or more sequences of instructions which, when executed by one or more processors, causes the one or more processors to perform the method recited in claim 14.

18. A computer-readable medium carrying one or more sequences of instructions which, when executed by one or more processors, causes the one or more processors to perform the method recited in claim 9.

19. The method of claim 1, said step of receiving privilege information comprises receiving a document in extensible markup language (XML).

20. A computer-readable medium carrying one or more sequences of instructions which, when executed by one or more processors, causes the one or more processors to perform the method recited in claim 19.

21. A computer-readable medium carrying one or more sequences of instructions which, when executed by one or more processors, causes the one or more processors to perform the method recited in claim 1.

22. A computer-readable medium carrying one or more sequences of instructions which, when executed by one or more processors, causes the one or more processors to perform the method recited in claim 2.

23. A method for controlling access to application-specific operations performed by an application, comprising the steps of:

communicating privilege information to a server that is distinct from the application;

sending a request, from the application to the server, for the server to determine, based on the privilege information, whether a particular application-specific operation is allowed under a particular set of conditions;

receiving from the server an indication of whether the particular application-specific operation is allowed under said particular set of conditions; and the application only allowing the particular application-specific operation if the server indicated that the application-specific operation was allowed under said particular set of conditions.

24. The method of claim 23 wherein:

the step of communicating privilege information to a server includes:

sending, to a server distinct from the application, first data that describes a first set of privileges for performing a first plurality of application-specific operations; and sending to the server second data that associates a first user of the application with a privilege in the first set of privileges.

25. The method of claim 24, wherein:

said step of sending the first data further comprises sending first data that also associates the first set of privileges with a first type of data items upon which the plurality of application-specific operations operate; and said step of sending the request further comprises sending the request that also indicates a particular data item; and said step of receiving the response based on the first data and the second data further comprises receiving the response also based on whether the particular data item is a member of the first type of data items.

26. The method of claim 25, wherein:

the method further comprises sending to the server third data that describes a different second set of privileges for performing a second plurality of application-specific operations on a different second type of data items; and said step of sending the second data further comprises sending second data that also associates a second user of the application with a privilege in the second hierarchy of privileges; and said step of receiving the response based on the first data and the second data further comprises receiving the response also based on whether a particular type of the particular data item is associated with a particular set of privileges for a particular plurality of application-specific operations that include the particular application-specific operation.

27. A computer-readable medium carrying one or more sequences of instructions which, when executed by one or more processors, causes the one or more processors to perform the method recited in claim 26.

28. A computer-readable medium carrying one or more sequences of instructions which, when executed by one or more processors, causes the one or more processors to perform the method recited in claim 25.

29. The method of claim 24, wherein the application does not manage a cache in fast memory for storing information that associates each of one or more users with one or more privileges in each of one or more sets of privileges including the first set of privileges.

30. A computer-readable medium carrying one or more sequences of instructions which, when executed by one or more processors, causes the one or more processors to perform the method recited in claim 29.

31. The method of claim 24, wherein the first set of privileges forms a first hierarchy of two or more levels of privileges.

32. A computer-readable medium carrying one or more sequences of instructions which, when executed by one or more processors, causes the one or more processors to perform the method recited in claim 31.

33. A computer-readable medium carrying one or more sequences of instructions which, when executed by one or more processors, causes the one or more processors to perform the method recited in claim 24.

34. The method of claim 23 further comprising the steps of:

receiving at the application a command from a particular user, which command involves the application performing a particular application-specific operation;

sending to the server a request that indicates the particular user and the particular application-specific operation;

wherein the step of receiving from the server an indication of whether the particular application-specific operation is allowed under said particular set of conditions includes receiving from the server a response that indicates whether the particular user may have the application perform the particular application-specific operation based on the first data and the second data; and performing the particular application-specific operation only if the response indicates the particular user may have the application perform the particular application-specific operation.

35. A computer-readable medium carrying one or more sequences of instructions which, when executed by one or more processors, causes the one or more processors to perform the method recited in claim 34.

36. The method of claim 23, said step of communicating privilege information further comprises sending a document in extensible markup language (XML).

37. A computer-readable medium carrying one or more sequences of instructions which, when executed by one or more processors, causes the one or more processors to perform the method recited in claim 36.

38. A computer-readable medium carrying one or more sequences of instructions which, when executed by one or more processors, causes the one or more processors to perform the method recited in claim 23.

* * * * *

UNITED STATES PATENT AND TRADEMARK OFFICE
CERTIFICATE OF CORRECTION

PATENT NO. : 7,020,653 B2 Page 1 of 1
APPLICATION NO. : 10/364610
DATED : March 28, 2006
INVENTOR(S) : Idicula et al.

It is certified that error appears in the above-identified patent and that said Letters Patent is hereby corrected as shown below:

Claim 5, column 14, line 39, replace "2" with --14--

Signed and Sealed this

Twenty-third Day of October, 2007

JON W. DUDAS
*Director of the United States Patent and Trademark Office*